(12) United States Patent
Kirchner

(10) Patent No.: US 10,330,383 B2
(45) Date of Patent: Jun. 25, 2019

(54) METHOD AND DEVICE FOR DISCHARGING COMPONENTS THAT ARE LESS VOLATILE THAN OXYGEN FROM AN AIR SEPARATION PLANT

(71) Applicant: Lars Kirchner, Dresden (DE)

(72) Inventor: Lars Kirchner, Dresden (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 14/944,854

(22) Filed: Nov. 18, 2015

(65) Prior Publication Data

US 2016/0187060 A1   Jun. 30, 2016

(30) Foreign Application Priority Data

Nov. 27, 2014  (EP) .................................... 14004007

(51) Int. Cl.
*F25J 3/04*      (2006.01)
*C01B 13/02*   (2006.01)
*F25J 3/08*     (2006.01)

(52) U.S. Cl.
CPC ....... *F25J 3/04412* (2013.01); *C01B 13/0248* (2013.01); *F25J 3/0486* (2013.01);
(Continued)

(58) Field of Classification Search
CPC .. F25J 3/04187; F25J 3/04412; F25J 3/04745; F25J 2215/34; F25J 2215/36; F25J 2200/32
See application file for complete search history.

(56) References Cited

U.S. PATENT DOCUMENTS 5,122,173 A       6/1992  Agrawal et al.
6,164,089 A  *  12/2000  Sweeny ............... F25J 3/04412
                                                                      62/640
(Continued)

FOREIGN PATENT DOCUMENTS

DE     4327311 A1   2/1995
EP    1 067 346 A1   1/2001

OTHER PUBLICATIONS

Anonymous, "Crude krypton/xenon recovery from a pumped-LOX ASU cycle", Research disclosure, Sep. 1, 1999, Bd. 425, Nr. 17, Mason Publications, Hampshire, Great Britain.
(Continued)

*Primary Examiner* — Brian M King
(74) *Attorney, Agent, or Firm* — Philip H. Von Neida

(57) ABSTRACT

A method and plant for discharging components that are less volatile than oxygen from an air separation plant that contains a main heat exchanger a side condenser and a two-column distillation column system for nitrogen-oxygen separation. The side condenser is constructed as a condenser-evaporator and is arranged in a vessel. A part of the feed air is cooled in the main heat exchanger and liquefied at least in part in the side condenser. A first oxygen fraction is withdrawn in the liquid state from the low-pressure column, introduced into the vessel of the side condenser and in part vaporized. A purge stream is taken off from the bottom of the vessel in the liquid state and discharged or withdrawn as end product. The vessel has a mass transfer section above the side condenser, which mass transfer section corresponds to more than one theoretical plate and fewer than 10 theoretical plates.

9 Claims, 1 Drawing Sheet

(52) U.S. Cl.
CPC ....... *F25J 3/04187* (2013.01); *F25J 3/04745* (2013.01); *F25J 3/08* (2013.01); *F25J 2200/34* (2013.01); *F25J 2210/40* (2013.01); *F25J 2220/44* (2013.01); *F25J 2220/52* (2013.01); *F25J 2235/50* (2013.01)

(56) References Cited

U.S. PATENT DOCUMENTS

| | | | |
|---|---|---|---|
| 6,694,775 B1 * | 2/2004 | Higginbotham | F25J 3/0409 62/643 |
| 2011/0214453 A1 | 9/2011 | Alekseev | |
| 2012/0285197 A1 * | 11/2012 | Davidian | F25J 3/04066 62/643 |

OTHER PUBLICATIONS

Dauer H., "New Developments Resulting in Improved Production of Argon, Krypton, Xenon", 5th Linde Air Separation Plants Symp., Jun. 25-27, 1986, pp. 1-21, Linde AG, Munich.

* cited by examiner

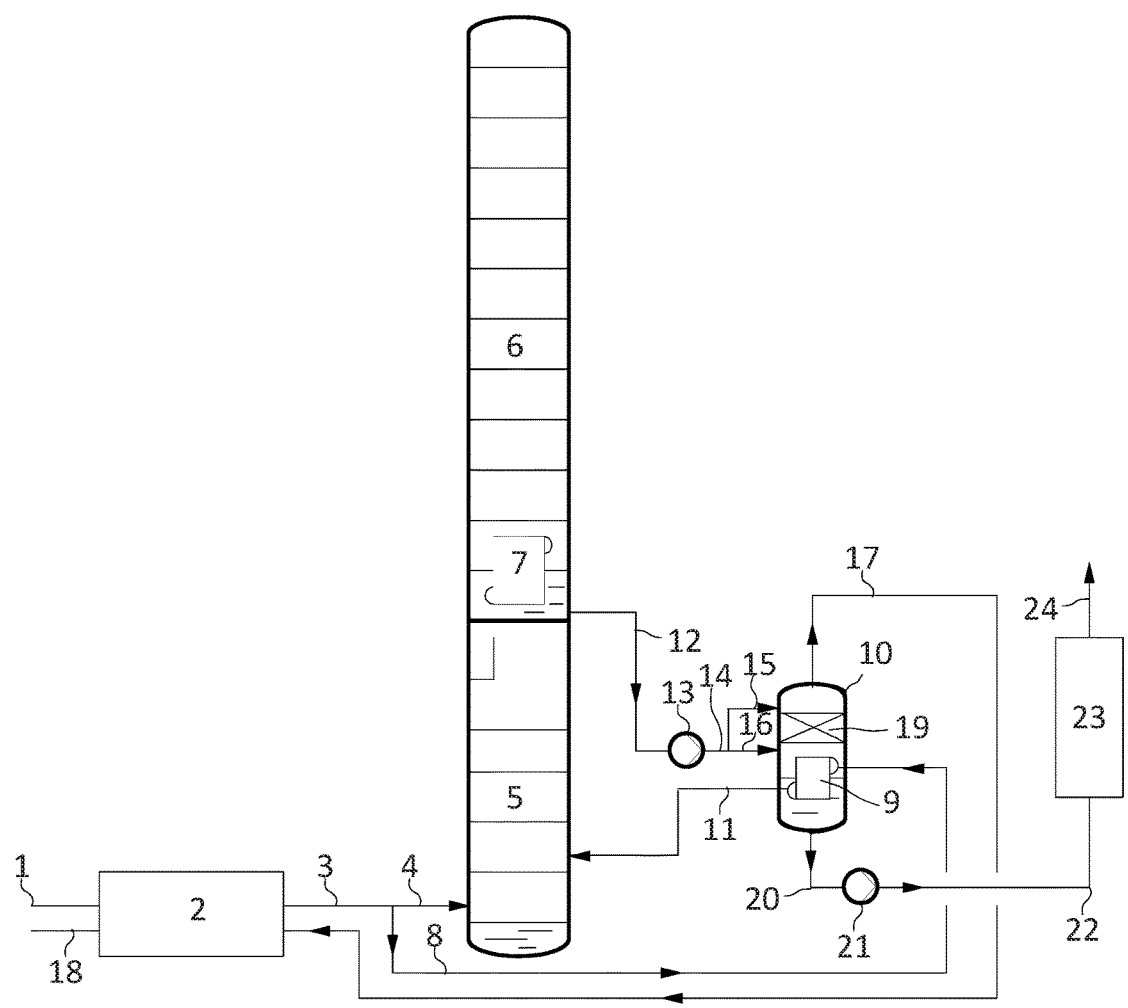

METHOD AND DEVICE FOR DISCHARGING COMPONENTS THAT ARE LESS VOLATILE THAN OXYGEN FROM AN AIR SEPARATION PLANT

CROSS REFERENCE TO RELATED APPLICATIONS

This application claims priority from European Patent Application EP 14004007.2 filed on Nov. 27, 2014.

BACKGROUND OF THE INVENTION

The invention relates to a classical side condenser method for discharging components that are less volatile than oxygen from an air separation plant that contains a main heat exchanger, a side condenser and a distillation column system for nitrogen-oxygen separation, wherein the side condenser is constructed as a condenser-evaporator and is arranged in a vessel and the distillation column system for nitrogen-oxygen separation has at least one high-pressure column and a low-pressure column and wherein, in the method a first feed air stream is cooled in the main heat exchanger and is introduced into the high-pressure column, a second feed air stream is cooled in the main heat exchanger and is at least in part liquefied in the side condenser, a first oxygen fraction is withdrawn in the liquid state from the low-pressure column and introduced into the vessel of the side condenser, the sump liquid of the vessel of the side condenser is at least in part vaporized, a second oxygen fraction is withdrawn in the gaseous state from the head of the vessel of the side condenser, the second oxygen fraction is warmed in the main heat exchanger, a third oxygen fraction is taken off at least intermittently as a purge stream from the bottom of the vessel in the liquid state and removed from the distillation column system for nitrogen-oxygen separation and the purge stream is subjected to at least one of the following treatments: discharge into the surroundings, withdrawal as end product, characterized in that: the vessel, above the side condenser has a mass transfer section which corresponds to more than one theoretical plate and fewer than 10 theoretical plates and the oxygen content of the third oxygen fraction is less than the oxygen purity of the first oxygen fraction.

The side condenser is constructed as a condenser-evaporator.

"Condenser-evaporator" denotes a heat exchanger in which a first condensing fluid stream enters into indirect heat exchange with a second vaporizing fluid stream. Each condenser-evaporator has a liquefaction space and a vaporization space which consist of liquefaction passages and vaporization passages, respectively. In the liquefaction space, the condensation (liquefaction) of the first fluid stream is carried out, and in the vaporization space the vaporization of the second fluid stream is carried out. Vaporization space and liquefaction space are formed by groups of passages which are in a heat-exchange relationship with one another.

The vaporization space of a condenser-evaporator can be constructed as a bath evaporator, falling-film evaporator or forced-flow evaporator. A side condenser is generally constructed as a bath evaporator (thermosiphon evaporator) which is heated with a part of the feed air.

In the liquid oxygen product of the low-pressure column (the "first oxygen fraction") components of the air that are less volatile than oxygen also accumulate. These remain behind in the liquid during the vaporization in the side condenser. In addition to the vaporized product (the "second oxygen fraction"), therefore, a purge stream (the "third oxygen fraction") must also be removed, in order that the less volatile components do not become enriched. This purging can be performed continuously or discontinuously, and is, for example, 0.2 mol % of the feed air amount.

Methods of the type described in the outset and corresponding devices are known from DE 4327311 A1 or WO 2010017968 A2 (=US 20110214453 A1).

"Remove from the distillation column system for nitrogen-oxygen separation" means here that the corresponding purge stream is not introduced into one of the separation columns of the distillation column system for nitrogen-oxygen separation. The purge stream in the case of the invention, is instead either discharged, that is to say let out into the atmosphere (optionally after external vaporization) or withdrawn as end product, by taking it off, for example as liquid product (as in DE 4327311 A1) or feeding it to another liquid product stream (as in WO 2010017968 A2=US 20110214453 A1) or to a gas product stream.

The object of the invention is to increase the yield of gaseous oxygen product in the form of the second oxygen fraction.

In the case of yield increase, a person skilled in the art first considers increasing the separation action of high-pressure column and/or low-pressure column, by modifying parameters such as pressure, reflux ratio and/or number of theoretical plates. The use of a third column for nitrogen-oxygen separation is also possible.

SUMMARY OF THE INVENTION

In contrast, the invention employs a side condenser.

The object is achieved by a method for discharging components that are less volatile than oxygen from an air separation plant that contains a main heat exchanger, a side condenser and a distillation column system for nitrogen-oxygen separation, wherein the side condenser is constructed as a condenser-evaporator and is arranged in a vessel and the distillation column system for nitrogen-oxygen separation has at least one high-pressure column and a low-pressure column and wherein, in the method
  a first feed air stream is cooled in the main heat exchanger and is introduced into the high-pressure column,
  a second feed aft stream is cooled in the main heat exchanger and is at least in part liquefied in the side condenser,
  a first oxygen fraction is withdrawn in the liquid state from the low-pressure column and introduced into the vessel of the side condenser,
  the sump liquid of the vessel of the side condenser is at least in part vaporized,
  a second oxygen fraction is withdrawn in the gaseous state from the head of the vessel of the side condenser,
  the second oxygen fraction is warmed in the main heat exchanger,
  a third oxygen fraction is taken off at least intermittently as a purge stream from the bottom of the vessel in the liquid state and removed from the distillation column system for nitrogen-oxygen separation and
  the purge stream is subjected to at least one of the following treatments:
    discharge into the surroundings,
    withdrawal as end product,
characterized in that
  the vessel, above the side condenser has a mass transfer section which corresponds to more than one theoretical plate and fewer than 10 theoretical plates and the oxygen content of the third oxygen fraction is less than the oxygen purity of the first oxygen fraction.

In the invention, a short mass transfer section is built into the vessel of the side condenser that is present in any case, which mass transfer section has, for example, 2 to 8, in particular 3 to 5 theoretical plates. As a result, —as a side effect—a slight increase in the purity of the second oxygen fraction is effected, which second oxygen fraction is taken off above the mass transfer section. However, much more important is the higher concentration of krypton, xenon and the other aft components that are less volatile than oxygen in the third oxygen fraction which is taken off at the sump. As a result, in the invention, a higher amount than before of less-volatile components can be withdrawn using one liter of purge stream. Vice versa, for the same purging action, a lower amount of purge (third oxygen fraction) is sufficient. The corresponding amount of oxygen is additionally available as a product and thereby increases the oxygen yield of the system.

The mass transfer section can be formed by any type of mass transfer elements, conventional trays (for example sieve trays), structured packing, or non-structured packing.

In the context of the invention all the possibilities mentioned in the introduction for further treatment of the purge stream are used.

With hindsight, something structurally similar appears to be shown in FR 2250971 A. However, the system is targeted towards an increase in purity, not to an increase in yield. A side condenser is elaborated into a true rectification column which makes impure oxygen (95 mol %) into pure oxygen (99.5% in the sump). The liquid from the sump of this rectification column is not removed from the distillation column system for nitrogen-oxygen separation, but introduced into the subcooling countercurrent exchanger thereof.

It is particularly expedient to bring the third oxygen fraction to an elevated pressure in the liquid state by a pump, and to vaporize it an external evaporator at this elevated pressure, wherein the vaporization proceeds in the external evaporator, in particular in indirect heat exchange with air or with a water bath. Subsequently, the third oxygen fraction is withdrawn as gaseous product, either separately, or mixed with another gaseous oxygen product stream.

Preferably, the purge stream is let out into the atmosphere in a gaseous state or withdrawn as gaseous product. In the latter case, the purge stream can, for example, be fed into a warm gaseous oxygen product stream in the liquid state and vaporized therein.

The first oxygen fraction can be introduced into the vessel of the side condenser portioned above and below the mass transfer section, or else only above.

Preferably, the first oxygen fraction has an oxygen purity of more than 89 mol %, preferably more than 93.0 mol %, for example, more than 95.0 mol % or more than 99.0 mol %.

The second oxygen fraction has an oxygen purity which is slightly higher than the oxygen purity of the first oxygen fraction. In a specific example, the oxygen purity in the mass transfer section of the side condenser of 99.72 mol % in the first oxygen fraction is increased to 99.77 mol % in the second oxygen fraction.

BRIEF DESCRIPTION OF THE DRAWINGS

The invention and also further details of the invention will be explained in more detail thereinafter with reference to an exemplary embodiment shown schematically in the drawing.

DETAILED DESCRIPTION OF THE INVENTION

Compressed, precooled and purified air 1 is cooled in a main heat exchanger 2. The cooled air is portioned into a first feed air stream 4 and a second feed air stream 8. The first feed air stream 4 is introduced into the high-pressure column 5 of a distillation column system for nitrogen-oxygen separation in a substantially gaseous state, which distillation column system in addition has a low-pressure column 6 and a main condenser 7.

The second feed air stream 8 is introduced into the liquefaction space of a side condenser 9 that is constructed as a condenser-evaporator, in particular as a bath evaporator, and is arranged in a vessel 10. In the side condenser, the second feed air stream 8 is completely, or substantially completely, liquefied. The liquefied second feed air stream 11 is introduced into the distillation column system for nitrogen-oxygen separation, in particular into the high-pressure column 5.

The connections between high-pressure column 5 and low-pressure column 6 which are usual for a Linde twin column and are familiar to a person skilled in the art are not shown in the schematic drawing. In the sump of the low-pressure column 6, liquid oxygen of a purity of, for example, 99.5 mol % is produced. This oxygen is withdrawn as first oxygen fraction 12 from the sump of the low-pressure column 6, optionally brought to an elevated pressure in a pump 13 and then applied in whole or in part via lines 14 and 15 to the head of the vessel 10 of the side condenser 9. A part 16 can also be fed in directly via the sump of the vessel 10. If the oxygen product is to be obtained at low-pressure column pressure (optionally plus hydrostatic potential between low-pressure column sump and side condenser), the pump 13 can also be omitted.

According to the invention, a mass transfer section 19 is arranged in the vessel above the heat-exchange block of the side condenser 9, in which mass transfer section, liquid flowing down from line 15 and gas generated in the side condenser can enter into countercurrent mass transfer.

From the head of the vessel 10, the gaseous oxygen product, the second oxygen fraction 17, is withdrawn, warmed in the main heat exchanger 2 and delivered via the product line 18. The second oxygen fraction, in the exemplary embodiment, has an oxygen purity 99.8% that is slightly increased in comparison with the low-pressure column.

It is of more importance that the content of less-volatile components in the third oxygen fraction, the purge stream 20, that is withdrawn in the liquid state has increased in comparison with the first oxygen fraction 12, for example by the factor 5 to 10. The exact enrichment depends on the purge amount and on the ratio of the streams 15 and 16. The purge stream 20, in the exemplary embodiment, is brought to a pressure of at least 51 bar using the pump 21, totally vaporized in a water-bath evaporator 23 and delivered via line 24 to the atmosphere. The purge line 20 can be operated continuously or intermittently.

What I claim is:

1. A method for discharging components that are less volatile than oxygen from an air separation plant that contains a main heat exchanger, a side condenser and a distillation column system for nitrogen-oxygen separation, wherein the side condenser is constructed as a condenser-evaporator and is arranged in a vessel and the distillation column system for nitrogen-oxygen separation has at least one high-pressure column and a low-pressure column, and wherein, in the method a first feed air stream is cooled in the main heat exchanger and is introduced into the high-pressure column, a second feed air stream is cooled in the main heat exchanger and is at least in part liquefied in the side condenser, a first oxygen fraction is withdrawn in a liquid state from the low-pressure column and introduced into the vessel of the side condenser, a sump liquid of the vessel in the side condenser is at least in part vaporized, a second oxygen fraction is withdrawn in a gaseous state from a head of the vessel of the side condenser wherein the second oxygen fraction has an oxygen purity which is higher than the oxygen content of the first oxygen fraction, the second oxygen fraction is warmed in the main heat exchanger, a third oxygen fraction is taken off at least intermittently as a purge stream from the bottom of the vessel in a liquid state and removed from the distillation column system for nitrogen-oxygen separation and the purge stream is discharged into the surroundings, wherein the purge stream comprises oxygen, krypton and xenon, characterized in that the vessel, above the side condenser has a mass transfer section which corresponds to more than one theoretical plate and fewer than 10 theoretical plates and the oxygen content of the third oxygen fraction is less than the oxygen purity of the first oxygen fraction.

2. The method according to claim 1, characterized in that the third oxygen fraction is brought to an elevated pressure in the liquid state by a pump and at this elevated pressure is vaporized in an external evaporator, wherein the vaporizing proceeds in the external evaporator.

3. The method according to claim 2, characterized in that the vaporizing proceeds in indirect heat exchange with air or with a water bath.

4. The method according to claim 1, characterized in that the third oxygen fraction is let out into the atmosphere in a gaseous state or withdrawn as gaseous product.

5. The method according to claim 1, characterized in that at least a part of the first oxygen fraction is introduced into the vessel of the side condenser above the mass transfer section.

6. The method according to claim 1, characterized in that a part of the first oxygen fraction is introduced into the vessel of the side condenser below the mass transfer section.

7. The method according to claim 1, characterized in that the first oxygen fraction has an oxygen content of more than 89.0 mol %.

8. The method according to claim 7, characterized in that the first oxygen fraction has an oxygen content of more than 99.0 mol %.

9. An air separation plant for discharging components that are less volatile than oxygen having a main heat exchanger, a side condenser and a distillation column system for nitrogen-oxygen separation, wherein the side condenser is constructed as a condenser-evaporator and is arranged in a vessel and the distillation column system for nitrogen-oxygen separation has at least one high-pressure column and a low-pressure column, and having a passageway for cooling a first air stream in the main heat exchanger, a feed line for introducing the cooled first feed air stream into the high-pressure column, a passageway for cooling a second feed air stream in the main heat exchanger, a flow line for introducing the cooled second feed air stream into a liquefaction space of the side condenser, a flow line for withdrawing a first oxygen fraction in liquid form from the low-pressure column, a line for introducing the liquid first oxygen fraction into the vessel in of the side condenser, introducing a sump liquid of the vessel into an evaporation space of the side condenser, a flow line for withdrawing a second oxygen fraction from a head of the vessel of the side condenser in a gaseous state, a passageway for warming the second oxygen fraction in the main heat exchanger, a flow line for withdrawing a third oxygen fraction from a bottom of the vessel as purge stream in a liquid state and having a flow line for removing the third oxygen fraction from the distillation column system for nitrogen-oxygen separation, which are constructed in such a manner that the purge stream in the operation of the plant is at least intermittently discharged into the surroundings wherein the purge stream comprises oxygen, krypton and xenon, characterized in that the vessel has a mass transfer section above the side condenser, which mass transfer section corresponds to more than one theoretical plate and fewer than 10 theoretical plates.

* * * * *